US009795865B2

(12) United States Patent
Stimac (10) Patent No.: US 9,795,865 B2
(45) Date of Patent: *Oct. 24, 2017

(54) AUTOMATED REMOTE PLAY CUE SPORT SYSTEM

(71) Applicant: Toccata Gaming International, LLC, Kimberly, WI (US)

(72) Inventor: Todd R. Stimac, Kimberly, WI (US)

(73) Assignee: Toccata Gaming International, LLC, Kimberly, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,562

(22) Filed: Feb. 1, 2016

(65) Prior Publication Data

US 2016/0144268 A1    May 26, 2016

Related U.S. Application Data

(63) Continuation-in-part of application No. 13/901,749, filed on May 24, 2013, now Pat. No. 9,248,368.
(Continued)

(51) Int. Cl.
*A63D 15/00* (2006.01)
*A63D 15/20* (2006.01)
(Continued)

(52) U.S. Cl.
CPC .......... *A63D 15/00* (2013.01); *A63B 24/0084* (2013.01); *A63B 37/0098* (2013.01);
(Continued)

(58) Field of Classification Search
CPC ...... A63D 15/20; A63D 15/00; A63D 15/006; A63D 15/005
(Continued)

(56) References Cited

U.S. PATENT DOCUMENTS 3,448,459 A    6/1969  Margolis
3,466,038 A    9/1969  Hill
(Continued)

FOREIGN PATENT DOCUMENTS

AT    WO 2009126982 A2 *  10/2009  ............. A63D 15/00
AU    WO 2010068989 A1 *   6/2010  ............. A63D 15/20
(Continued)

OTHER PUBLICATIONS

Lozano-Nieto, Albert, "RFID Design Fundamentals and Applications," © 2011 Taylor and Francis Group, LLC, Boca Raton, Florida, ISBN-13: 978-1420091250 (Book—Copy Not Provided).
(Continued)

*Primary Examiner* — Mitra Aryanpour
(74) *Attorney, Agent, or Firm* — Joseph T. Leone, Esq.; DeWitt Ross & Stevens S.C.

(57) ABSTRACT

Cue sports tables are provided with associated automated sensor and positioning assemblies. This permits competitors to play each other on separate tables. The tables automatically sense ball positions on one table and communicate that to a positioner associated with another table. That positioner then automatically drives balls on that other table to a mimicking position. These systems also permit a shot to be replayed if desired.

12 Claims, 4 Drawing Sheets

Related U.S. Application Data (60) Provisional application No. 61/696,362, filed on Sep. 4, 2012.

(51) Int. Cl.

| | | |
|---|---|---|
| *A63B 24/00* | (2006.01) | |
| *A63B 37/00* | (2006.01) | |
| *A63B 37/02* | (2006.01) | |
| *A63B 43/00* | (2006.01) | |
| *G07F 17/38* | (2006.01) | |
| *G09B 19/00* | (2006.01) | |
| *A63B 71/06* | (2006.01) | |

(52) U.S. Cl.
CPC ............ *A63B 37/02* (2013.01); *A63B 43/004* (2013.01); *A63D 15/20* (2013.01); *G07F 17/38* (2013.01); *G09B 19/0038* (2013.01); *A63B 71/0669* (2013.01); *A63B 2209/08* (2013.01); *A63B 2220/10* (2013.01); *A63B 2220/16* (2013.01); *A63B 2220/30* (2013.01); *A63B 2220/806* (2013.01); *A63B 2225/20* (2013.01); *A63B 2225/54* (2013.01); *A63B 2243/002* (2013.01); *A63D 15/006* (2013.01)

(58) Field of Classification Search
USPC .................................. 471/1, 4, 23–25, 27, 2
See application file for complete search history.

(56) References Cited

U.S. PATENT DOCUMENTS

| | | |
|---|---|---|
| 4,142,720 A | 3/1979 | Davis |
| 4,516,770 A | 5/1985 | Brookes et al. |
| 4,882,676 A | 11/1989 | Van De Kop et al. |
| 5,066,008 A | 11/1991 | Rivera |
| 5,359,510 A | 10/1994 | Sabaliakskas |
| 5,857,912 A | 1/1999 | Freitag et al. |
| 5,893,791 A | 4/1999 | Wilkinson |
| 6,609,307 B1 | 8/2003 | Haynes |
| 6,764,410 B2 | 7/2004 | Apple et al. |
| 7,361,083 B2 | 4/2008 | Moreno |
| 7,491,129 B1 | 2/2009 | Stanley |
| 7,831,337 B2 | 11/2010 | Greenspan |
| 8,016,687 B2 | 9/2011 | Martin et al. |
| 8,292,733 B2 | 10/2012 | Crawford et al. |
| 8,616,971 B2 | 12/2013 | Lundback et al. |
| 8,734,262 B1 | 5/2014 | Yovanovich et al. |
| 2002/0010032 A1 | 1/2002 | Stiteler |
| 2004/0132535 A1 | 7/2004 | Sumko |
| 2006/0042105 A1 | 3/2006 | McGrail |
| 2006/0063599 A1 | 3/2006 | Greenspan |
| 2008/0182675 A1 | 7/2008 | Flores |
| 2008/0269925 A1 | 10/2008 | Lita |
| 2011/0021256 A1 | 1/2011 | Lundback et al. |
| 2011/0294585 A1 | 12/2011 | Penna et al. |
| 2012/0083342 A1 | 4/2012 | Cross et al. |
| 2014/0066217 A1 | 3/2014 | Stimac |

FOREIGN PATENT DOCUMENTS

| | | |
|---|---|---|
| DE | 20303543 U1 | 7/2003 |
| DE | 202006003414 U1 | 7/2007 |
| DE | 102006007609 A1 | 8/2007 |
| WO | WO 2009126982 A2 | 10/2009 |

OTHER PUBLICATIONS

Osorno A. et al., Hustler's Inc. Electronic Pool Scoring System Final Design Report, pp. 1-9 (2007).

http://www.instructables.com/id/Automated-Pool-Table/, Two pages of a Jul. 27, 2012 excerpt from instructables.com referring to a 2008 automated pool table.

* cited by examiner

AUTOMATED REMOTE PLAY CUE SPORT SYSTEM

CROSS-REFERENCE TO RELATED APPLICATION

This application is a continuation-in-part of co-pending application Ser. No. 13/901,749, filed May 24, 2013, now U.S. Pat. No. 9,248,368, issued Feb. 2, 2016, which claims priority to provisional application Ser. No. 61/696,362, filed Sep. 4, 2012, both of which are incorporated herein by reference.

BACKGROUND OF THE INVENTION

The device disclosed and claimed herein relates to systems that allow a cue sport (e.g. pool, billiards, snooker, and the like) to be played by competing players who are shooting on different tables. More particularly, it relates to a system that senses the position of balls on one cue sport table, and then automatically repositions balls on the other table so as to mimic the ball array on the first table.

Cue sports are games where a stick is used to drive a specified ball (typically a cue ball) in relation to other balls on a table (often a cloth covered table with surrounding resilient bumpers). Many such tables have pockets where one aspect of the game is to drive specified balls into the pockets. Other such tables do not have pockets.

In most cue sports the balls positioned on the game table are differently numbered, differently colored and/or differently patterned from each other. For example, in a common form of pocket pool one grouping of the balls are different solid single colors, another grouping of the balls are striped and different colors, and one other ball (the cue ball) is white. As a result, each ball can easily be uniquely visually identified by players.

In most cue sports competitors alternate shots (unless a player earns another shot such as by pocketing a specified type of ball). Also, in competitive cue sports there are most typically two players, albeit in some social matches teams of players compete by alternating shots within a team.

Regardless, cue sport matches have typically required all the competitors to play on the same table so as to be able to shoot from the last position left by their competitor(s). This required competitors to travel to a common location, which added cost and/or restricted competition.

There have been attempts to permit players at remote locations to compete with each other in certain other types of games. For example, card games and chess are now often played on-line, using a virtual display system.

Also, in U.S. Pat. No. 7,361,083 and U.S. patent application publication 2012/0083342 there were disclosures of placing one dart board in one facility, another dart board at another facility, and allowing competitors to compete with each other remotely using those dart boards. An automated system used sensors to determine/referee the result of each round of dart throwing at each facility, communicate those results to the other location, and keep track of scoring.

However, there was no attempt to cause the position of darts on the first board to be mimicked on the second dart board. This somewhat altered the nature of the game as in single location dart competition the players alternate throws. Thus, a second thrower sees the first thrower's dart somewhat "in their way" when they throw.

There have also been attempts to develop robotic cue stick systems such that a player playing live at a given pool table can to some extent compete with someone who is located remotely. In this system, the remote player instructs a robotic system over telecommunications and the robotic system plays against the first player on the first player's table.

A web cam helps identify where particular balls are located on the table, and communicates that information to the remote player. However, this system did not allow the remote player to actually play a shot themselves, as distinguished from instructing a robot to shoot. See Automated Pool Table, www.instructables.com (2008).

Other systems have been developed to automatically determine the positioning of pool balls. For example, it has been proposed to place RFID tags in pool balls and an array of RFID readers around a pool table (e.g. adjacent specified pockets). This was used to identify which balls had been pocketed, and was incorporated into an automated scoring system. See A. Osorno et al., Hustler's INC. Electronic Pool Scoring System Final Design Report (2007). However, this RFID capability was not used to facilitate remote play.

Apart from the desirability of permitting remote play, it is sometimes desirable for a player to have an opportunity to play a pool shot that previously occurred. For example, a player may want the opportunity to repetitively practice a particular shot. Moreover, when the game is at a public place such as a bar there are sometimes situations where a player is accidentally bumped into (or otherwise inappropriately disturbed) as they are shooting a shot. It would be desirable to have the capability for a shot to be retaken (to remove that unfairness from the game).

Further, in some cases it is of interest for players to try a shot that someone (who is not their competitor) made. For example, a match between two champion level players might have had several very unique shots that an amateur want to see if they could make.

In the past, playing a shot that was previously made has required the player to try to remember the prior position of the balls, and then try to manually position the balls. This introduced considerable inaccuracy into those replays, particularly if the prior shot wasn't filmed.

Hence, a need still exists for developing improved ways for cue sport competitors to play each other from remote locations, and in any event for developing improved replay capabilities in cue sports.

SUMMARY OF THE INVENTION

The present invention provides a system for enabling a cue sport match between two remotely located opponents. There is a first cue sport table at a first location, the first cue sport table having a first sensor assembly for sensing ball locations on the first table and a first positioner for automatically moving balls on the first table to selected positions. There is also a second cue sport table at a second location remote from the first location, the second cue sport table having a second sensor assembly for sensing ball locations on the second cue sport table and a second positioner for automatically moving balls on the second table to selected positions.

The second positioner can, if provided with information about ball positions on the first table, cause ball positions on the second table to essentially mimic ball positions on the first table (e.g. once a first player has played a shot on the first table). Similarly, the first positioner can, if provided with information about ball positions on the second table, cause ball positions on the first table to essentially mimic ball positions on the second table (e.g. if a second player has played a shot in their turn on the second table).

The cue sport is preferably selected from the group consisting of pool, billiards, and snooker. Most preferably the cue sport is one in which there are pockets positioned adjacent segments of peripheral resilient bumper rails.

In other preferred aspects of the invention there is a means for transmitting information about ball positions on the first table to the second positioner, and a means for transmitting information about ball positions on the second table to the first positioner. Such means may comprise links from the sensor assemblies to computers and links from the computers to the positioners.

In one preferred form the sensor assemblies may be one or more digital cameras (such as web cameras) that visually record the location (and preferably also colors of and patterns on) balls on the tables. For example, one camera can be directly over, and two cameras can be along sides of, the ball array.

These cameras can be linked to a computer which examines the visual images, and determine which balls are at which positions based thereon. Compare U.S. Pat. No. 7,831,337 and its teachings of using multiple cameras to acquire such images, followed by transmitting those images to a computer for analysis to determine identity and locations of balls.

In supplementation and/or replacement for such camera systems, the sensor assemblies may comprise RFID tags in the balls and an RFID reader array (e.g. compare the previously noted Hustler's system). See also U.S. Pat. No. 4,516,770.

With respect to the automated positioning system, we prefer that balls be formed with a ferromagnetic content. We then provide an electromagnetic array of regions that can be separately activated. For example, there could be several hundred small electromagnets positioned in a grid under the table, where the magnets are separately activatable, and most preferably separately controllable as to their power when activated.

We then propose to link the array to software such that when certain balls are to be moved, the other balls may be "anchored" by activating electronic attraction directly under them. The balls to be moved can then be moved by a sequential turning on and off of electromagnetic attraction adjacent the ball positions along the path where movement is desired.

In a particularly preferred form such tables can have a capability that stores information about a selected positional array of balls on the table (e.g. the last positions of the balls prior to a recent shot). There can then be a reset capability that when activated instructs the positioner associated with that table to cause the balls to return to that earlier array position.

There may also be a scoring system that automatically keeps track of and displays results of play at the first and second tables, using ball position information to inform itself (e.g. did the correct type of ball enter a pocket).

The system may also have the capability of automatically initially setting up ball positions (e.g. racking) on the first and second tables at the start of a game. Alternatively, this may be done manually to provide players with more of a feel of a "real" game.

Further, there may be automated controls linked to the sensor system and positioner for delivering balls to the table at the start of the game, or to deliver a ball that has been improperly pocketed back to the table. For example, the system preferably will also have the capability of automatically determining when a scratch has occurred, and then automatically releasing the cue ball in such a case for further play, or determining if an incorrect type of ball has been properly pocketed (e.g. a striped ball in eight ball), and return (and position) an improperly pocketed ball for further play.

The system is particularly well suited for permitting matches between players located at remote commercial locations. In commercial establishments having such tables (e.g. bars, pool halls) the system may also include the ability to restrict play absent an authorization communication from a central location, or absent currency payment.

Where the invention provides a system that allows a player to replay a shot (e.g. for training purposes or if the player was improperly disturbed when shooting), the replay capability may be conditioned on a second remote player (or a facility owner) consenting to the replay.

A replay system can be implemented by a cue sport table having a sensor assembly for sensing ball locations on the table and a positioner for automatically moving balls on the table to selected positions. In one embodiment relevant to replaying the positioner for the same table as where a shot just occurred is the one that is activated. A memory capability can store information about the positioning of balls on the table at a particular time (e.g. at a time immediately prior to a recent shot).

In yet another form the invention provides a cue sport table. It has a table for playing a cue sport thereon, a sensor assembly for sensing ball locations on the table, a positioner for automatically moving balls on the table to selected positions, and a computer capable of activating the positioner to cause the positioner to automatically move balls on the table to specified positions.

In some preferred forms the computer is capable of storing information about a first array of ball positions, and also information about a second array of ball positions. This could enable multiple shots to be taken back in the game being played, or multiple ball positions from a stored historical game to be positioned. With this capability one can selectively direct the positioner to move balls to the selected array position.

This table could be further enhanced by having the sensor assembly able to sense information about the speed of a shot, pass that information to the computer, and then have the computer control a robotic cue stick. This enables the table to also mimic a shot previously made without requiring a human to make the shot.

The present invention thus enables cue sport players at remote locations to play each other notwithstanding that they are playing on two different tables. The "smart" tables of the present invention can sense what has happened at a competitor's table and then cause a player's own table to mimic the post-shot position that has just been reached on the competitor's table.

If the first player has not earned another shot (e.g. pocketed a ball), the second player will thereby be enabled to shoot on the second table using a ball array that is essentially the same as that present on the first table. Thereafter, the result of the second player's playing can be essentially mimicked at the first table, enabling the first player to play from the proper position when it is their turn. This is all achieved automatically, and in a way likely to be perceived as fair to all competitors. The tables can also act as a partial referee, and facilitate proper automated scoring.

This enables players to play each other as if they were in the same room playing on the same table, but without the burden and cost of having to travel to the same location. Thus, this achieves the desired more "global" competition. While this type of system is intended primarily for commercial establishments (e.g. a chain of bars located in various cities), it may also be of interest for people who wish to play their good friends who are now remotely located, or who wish to stay at home and play while competing with someone located at a local bar.

Further, these tables add an additional element of fairness by enabling competitors to replay a shot if one is unfairly disturbed during a shot. Preferred embodiment's also allow a selected array of balls to be set up, and then have the system mimic a shot previously made (e.g. a robot shooting a ball at the same speed and angle).

These and still other advantages of the present invention will become more apparent, and the invention will be better understood, by reference to the following description of preferred embodiments of the present invention.

DETAILED DESCRIPTION

Figure 1:
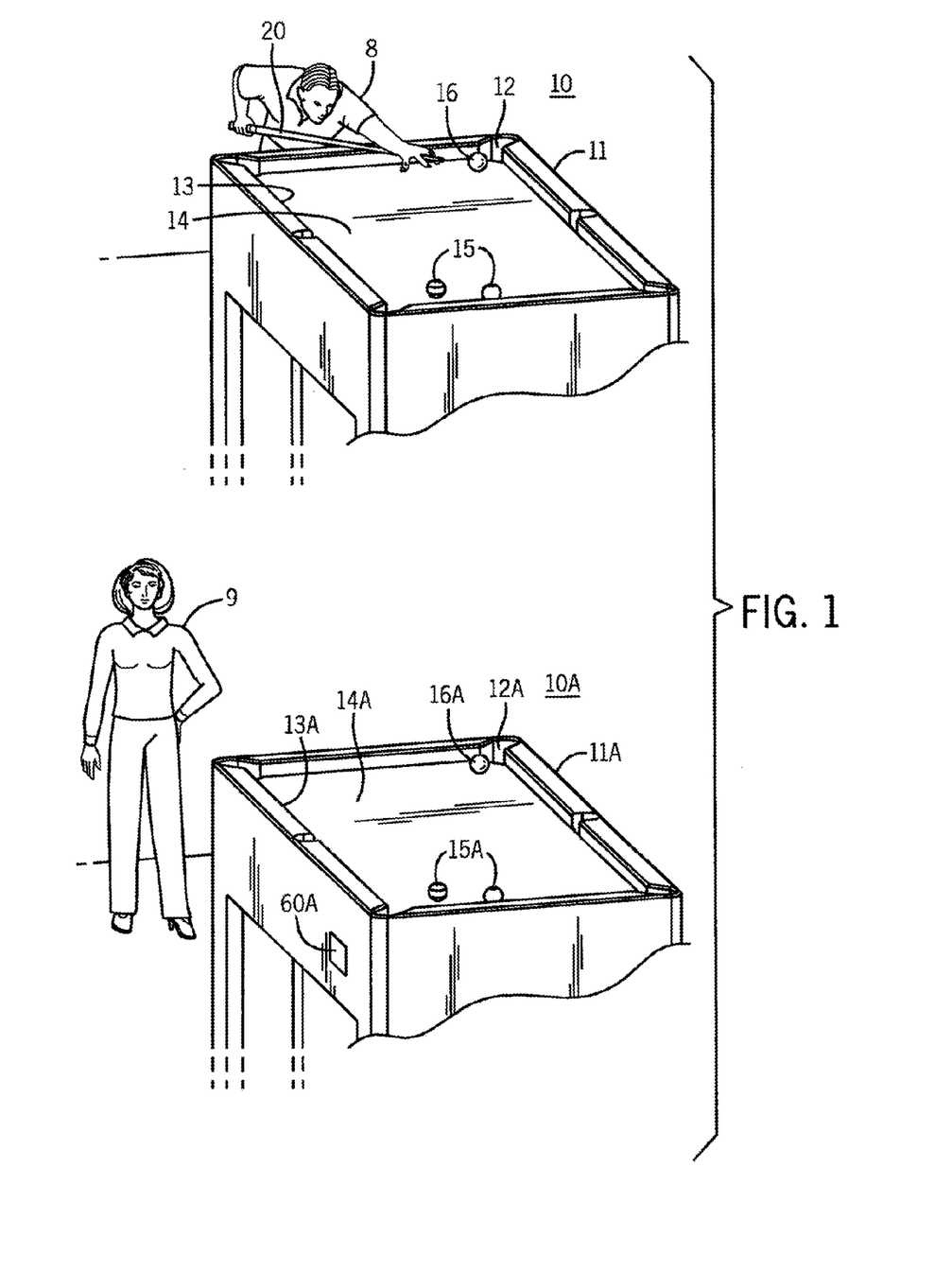
FIG. 1 depicts in schematic form two pool players playing each other using a system of the present invention, where the players are playing remotely from each other on separate tables.

A preferred system of the present invention enables two players 8 and 9 to play each other at a cue sport (in this case pocket pool). At a first location 10 there is a first pool table 11 having pockets 12, a rubber bumper system 13, a cloth playing surface 14, an array of target balls 15, and a cue ball 16. At a remote location 10A there is a second pool table 11A having pockets 12A, a rubber bumper system 13A, a cloth playing surface 14A, an array of target balls 15A, and a cue ball 16A. The ball arrays on the respective tables 11 and 11A are shown as essentially identical.

The first player 8 is shown using a cue stick 20 to strike the cue ball 16, and is participating in playing pocket pool. As indicated/implied by FIG. 2, the tables each have their own sensor assembly 21 and positioner 22.

Figure 2:
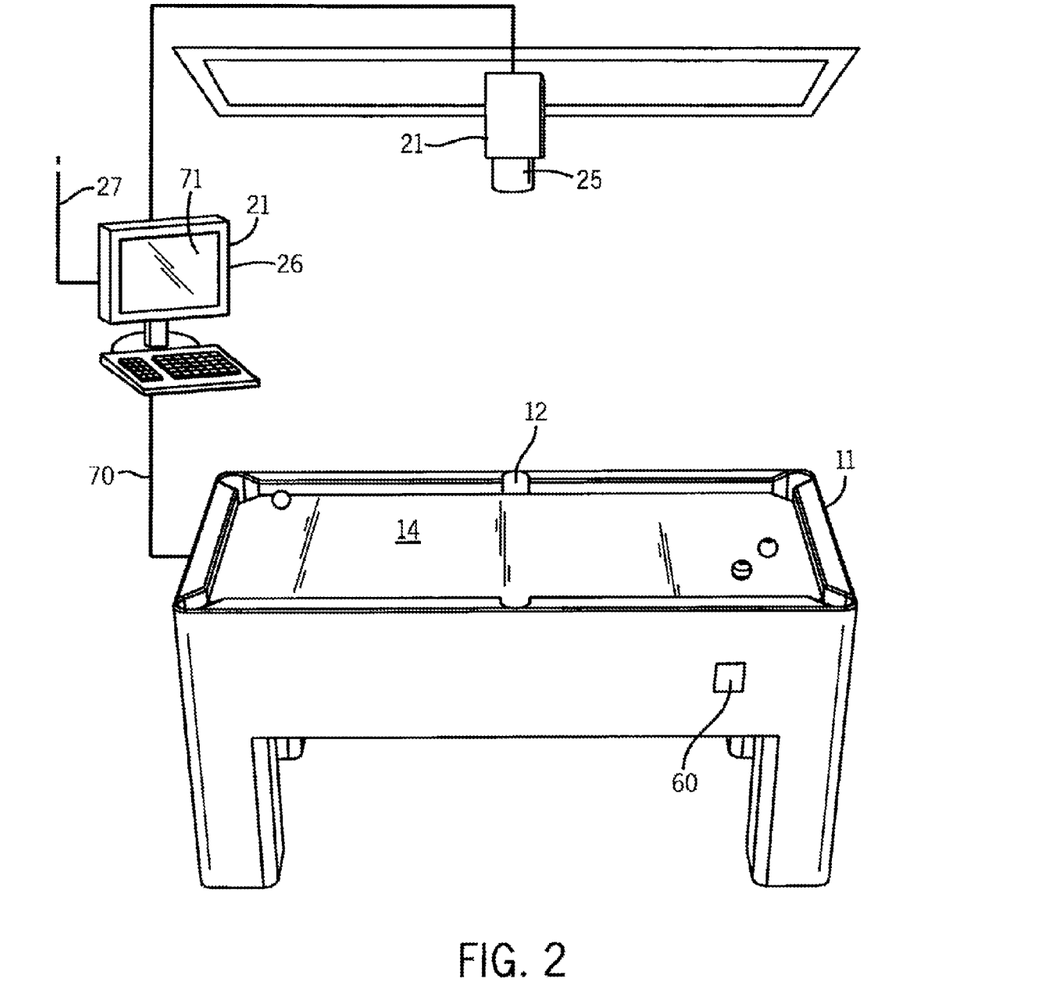
FIG. 2 is a schematic depiction of a sensor assembly of the present invention.

In the form shown in FIG. 2 each sensor assembly comprises at least a first digital web cam 25 positionable over the table that is capable of determining the location of each ball on a table, and preferably its color, whether it has stripes, and what any part of a number visible on it depicts. This information is communicated to a computer 26, which then processes that information and transmits it via a telecommunications system (e.g. the internet) and linkages 27/28 to a positioner 22 associated with another table (FIG. 4).

See generally U.S. Pat. No. 7,831,337 which describes how a video system can be used to determine ball locations and ball identification through use of such a camera system. As indicated in that patent such a system may be further enhanced with the addition of one or more cameras along the sides which provide additional opportunities to record ball specifics that are less apparent in top view. Further, this system could be adapted to monitor and transmit to a computer the speed of a shot, and its angle. The content of this patent, and of all other publications referred to herein, are incorporated by reference as if fully set forth herein.

Figure 3:
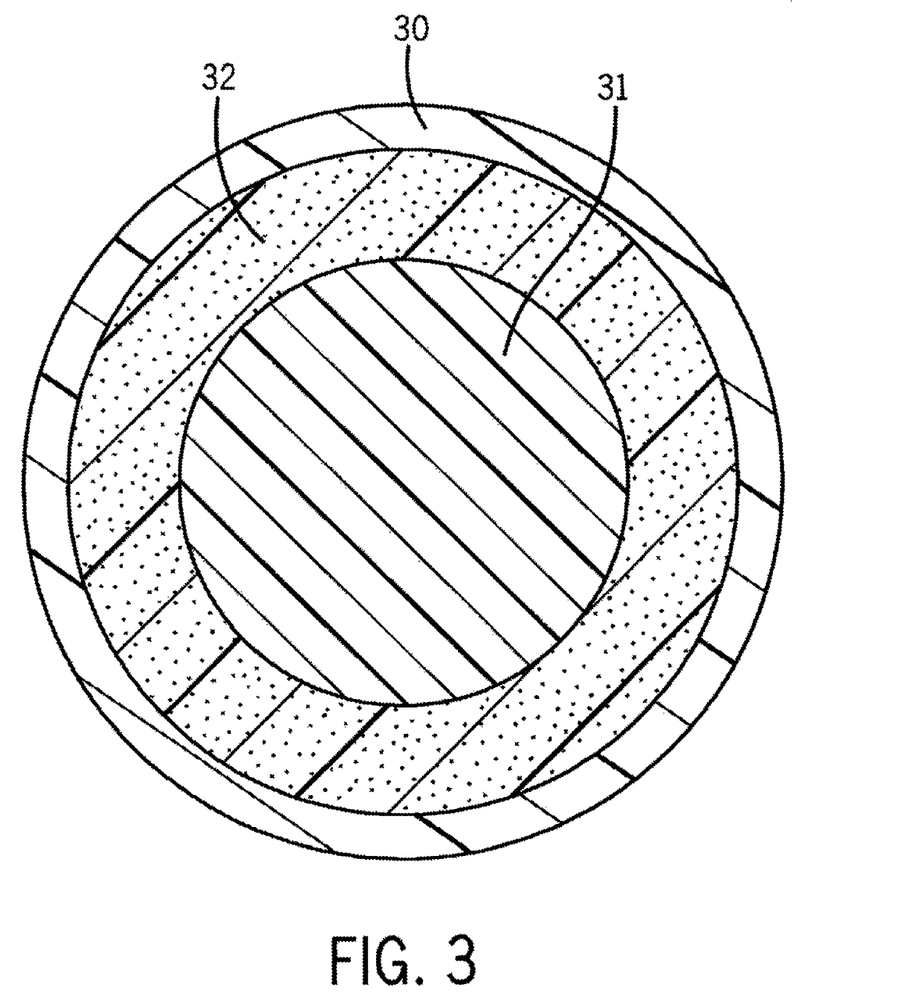
FIG. 3 is a cross sectional view taken through one type of ball that can be used with the present invention.

Such camera-based sensor system(s) may be supplemented and/or replaced with an RFID-based sensor system. For example, one could place unique RFID tags in each pool ball and provide an array of RFID readers (e.g. at particular pocket locations). This would provide a double check regarding which balls have been pocketed. In any event, as shown in FIG. 3, each ball can be provided with ferromagnetic material. This could be achieved by placing that material only in a central core. However, for purposes of further illustration, we show in FIG. 3 a ball having an outer core 30 (e.g. made of polyurethane), an inner core 31 made of polyester, and a middle layer 32 in which magnetically attractable iron powder has been mixed in with polyester resin. This allows an electromagnet to attract the balls.

Figure 4:
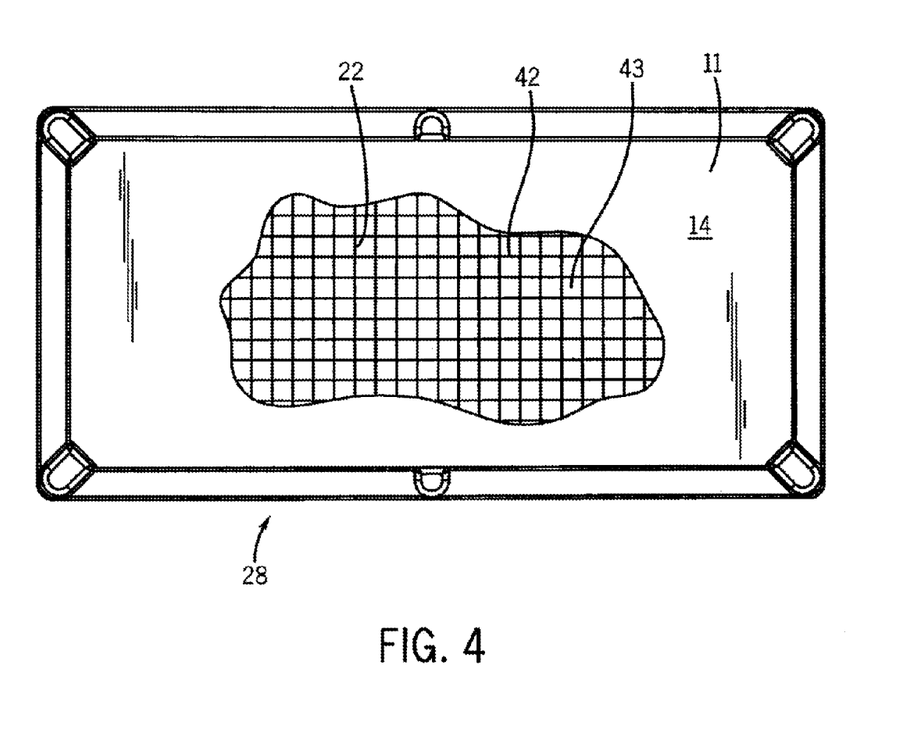
FIG. 4 is a top plan view of a pool table embodying principles of the present invention, where a portion of the table is fabric has been torn away for illustrative purposes.

As noted in FIG. 4, the table 11 may have a grid array 42 of electromagnetic sections immediately under its cloth 14. Each section 43 may have a tiny independent electromagnet (e.g. with several hundred electromagnets under the table cloth for each table). These electromagnets are linked to the computer control system such that each can be turned on or off independently from each other, and preferably the power level of each magnet can be adjusted independently.

The electromagnetic positioner 22 may move one or more balls in response to computer control. The computers 26 use the sensors to determine where the balls currently are on both tables, and if different determine a reasonably efficient means of moving the balls to the target positions (for example, by using conventional path finding software based on something like A* path finding).

For example, if ten balls are correctly positioned already, and only two need to have their position changed to mimic what happened on the last shot on the other table, the software will check to see if there is a clear path to make the movement changes while only adjusting two balls. If so, only two balls will be moved along that path. If not, an efficient number of balls will be moved as required. Note that the movement path need not (and probably typically won't) mimic how the balls on the other table actually reached the new position.

In a particularly preferred form the system can also determine which balls are not to be moved, and then strongly activate the electromagnetic field directly under them (to help ensure that they will not be disturbed when other balls are moving). The software can then plot out and control how to use immediately adjacent regions 43 to magnetically drag the moving balls to their new positions.

Alternatively, the grid array 42 may comprise an array of wound electromagnetic coils in multiple layers with in which the magnetic fields generated by each individual coil have a significant amount of physical overlap, preferably 10% to 50% overlap. The number of coils, their physical size, the size of the magnetic field generated by each coil, and the overlap of the magnetic fields generated by the entire collection of coils thus determines the granularity (that is, the accuracy and precision) of ball movement and positioning. As a general rule, and all other considerations being the same, smaller coils in a higher quantity (i.e., a higher density) will create more precise ball movement and positioning. However, it is easier to generate a stronger magnetic field in a physically larger coil; thus larger coils in a smaller quantity will result in more electromagnetic strength per coil.

Pulse width modulation (PWM) is one technique that can be used to power the coils accordingly to move or to anchor specific balls in order to reposition the balls following each player's turn. A powered coil will draw a specifically coded ball toward itself—that is, the powered coil will draw nearby balls toward the center of the coil. The coils are dimensioned and configured simultaneously to generate electromagnetic current within the balls, power the RFID tags within the balls, and to read the RFID tags within each ball. Additionally, the coils incorporate an alternating current waveform (transformed from the direct current pulse width modulation) to avoid magnetizing the steel/iron within the balls.

Pulse width modulation as a technique to monitor interactions with tangible objects (such as the billiard balls described herein), wherein each tangible object is associated with a unique RFID tag, is well known and will not be discussed. For an in-depth discussion, see, for example, Albert Lozano-Nieto, "RFID Design Fundamentals and Applications," © 2011 Taylor and Francis Group, LLC, Boca Raton, Fla., ISBN-13: 978-1420091250.

The balls themselves may comprise a plastic or resin core, wrapped with a steel mesh, wrapped with a thin copper mesh, and wrapped finally in an outer shell of thermoplastic or thermosetting resin to give the balls the look, feel and heft of conventional pool balls.

To plot the movement of objects in the coil array, a video decoder is used. The video decoder is dimensioned and configured to take and store an image file in any suitable format now known or developed in the future (including but not limited to JPEG or PNG). The video decoder is programmed to translate the pixel information from the image file into corresponding coordinates (Cartesian coordinates, polar coordinates, etc.) and PWM information for each ball location. In one embodiment of the video decoder, each pixel of the image file represents or corresponds to a separate coil in the array 42. The RGB value of each pixel is then used to encode/decode the amount of power that the coil should energize. In this fashion, the video image file is used to duplicate the position of the balls as shown in the image file with the actual positioning of the balls on the two gaming tables.

Thus, in one version, the system comprises:

a first cue sport table with a playing surface and balls at a first location, said first cue sport table having a first sensor assembly for sensing locations of the balls on the first table and a first positioner for automatically moving the balls on the first table to selected positions; and a second cue sport table with a playing surface and balls at a second location remote from the first location, the second cue sport table having a second sensor assembly for sensing locations of the balls on the second cue sport table and a second positioner for automatically moving the balls on the second table to selected positions;

a computer controller operationally linked to the first and second sensor assemblies and the first and second positioners, wherein the computer controller is configured to transmit data representing the locations of the balls on the first table from the first sensor assembly to the second positioner and data representing locations of the balls on the second table from the second sensor assembly to the first positioner, and is further configured to calculate a path for each ball on the first and second tables to follow in order for the balls to reach the selected positions, and further wherein the data representing locations of the balls on the first and second tables is stored in a video file representing a grid array of pixels;

wherein the first and second positioners each comprise a grid array of independently activatable electromagnetic sections underlying the playing surface of the first and second tables, wherein each independently activatable electromagnetic section corresponds to a pixel in the grid array of pixels in the video file;

wherein the balls at the first and second locations comprise ferromagnetic material that is magnetically responsive to the electromagnetic sections of the first and second positioners;

wherein the second positioner, when provided with the data representing the locations of the balls on the first table, is configured to cause ball locations on the second table to mimic ball locations on the first table by selectively activating and deactivating the electromagnetic sections of the second positioner in the paths calculated by the computer controller; and wherein the first positioner, when provided with the data representing the locations of the balls on the second table, is configured to cause ball locations on the first table to mimic ball locations on the second table by selectively activating and deactivating the electromagnetic sections of the first positioner in the paths calculated by the computer controller.

In a preferred embodiment one main purpose of the sensor assemblies and the positioners is to allow the position of balls on a second table to automatically be adjusted to the position just reached on the other table (allowing the competitor to shoot at the same array, but on a different table). However, a second main optional purpose is to permit play of a previous shot (e.g. by a competitor, or by the individual playing the game, or by a player in a stored historical game). For example, a positioner can cause the same table where a shot has just been taken to have its balls returned to the immediately prior position (by touching a replay button 60).

If desired, one may condition the operability of the replay button 60 on a remote consent (e.g. a facility operator electronically agreeing, or a second replay button 60A also being pressed to indicate the competitor's consent). Alternately, the replay could be configured to work with just a pressing a button 60 (e.g. while practicing a particular shot).

In other forms the sensor assembly could be tied into the computer 26 via linkage 70 to form a scoring system that automatically keeps track of (and displays on screen 71) results of play.

The positioner systems may also move balls for other purposes. For example, they could automatically rack at the beginning of games, or prematurely truncate a game (e.g. if players at a table are acting inappropriately), and typically would have the capability of returning improperly pocketed balls to the table or a specific spot on the table.

While systems of the above kind could be used to permit play between remote residences, or to permit play between a home and a commercial pool hall, it is expected that in most cases these tables will be located at commercial establishments where payment for play is desired/required. In such a case the system could use communication linkage 70 to provide a capability of conditioning use of the system on an authorization communication or currency payment.

What has been described thus far are only the preferred embodiments. The invention is not to be so limited. For example, as discussed above, the system could be designed to also store historically significant pool game information, and then play back (or provide the opportunity to play) the shot results in live form. For example, if someone recorded a game between two famous pool players, information about ball positions after each shot could be stored, with players given the opportunity to try their hand at the same difficult shots that the famous player faced.

However, in an alternative form the system could be tied into HD cable television which is showing a game. The HD system could have web cameras that act as the sensor for games being broadcast, providing the opportunity for viewers to play along with a broadcast game with respect to selected shots.

The claims should therefore be looked to in order to judge the full scope of the invention.

The invention provides cue sports tables and associated systems which permit people to play each other while at remote locations, and/or more accurately play a shot that has previously been taken.

What is claimed is:

1. A system for enabling playing a cue sport match between two remotely located opponents, comprising:
   a first cue sport table with a playing surface and balls at a first location, said first cue sport table having a first sensor assembly for sensing locations of the balls on the first table and a first positioner for automatically moving the balls on the first table to selected positions; and
   a second cue sport table with a playing surface and balls at a second location remote from the first location, the second cue sport table having a second sensor assembly for sensing locations of the balls on the second cue sport table and a second positioner for automatically moving the balls on the second table to selected positions;
   a computer controller operationally linked to the first and second sensor assemblies and the first and second positioners, wherein the computer controller is configured to transmit data representing the locations of the balls on the first table from the first sensor assembly to the second positioner and data representing locations of the balls on the second table from the second sensor assembly to the first positioner, and is further configured to calculate a path for each ball on the first and second tables to follow in order for the balls to reach the selected positions, and further wherein the data representing locations of the balls on the first and second tables is stored in a video file representing a grid array of pixels;
   wherein the first and second positioners each comprise a grid array of independently activatable electromagnetic sections underlying the playing surface of the first and second tables, wherein each independently activatable electromagnetic section corresponds to a pixel in the grid array of pixels in the video file;
   wherein the balls at the first and second locations comprise ferromagnetic material that is magnetically responsive to the electromagnetic sections of the first and second positioners;
   wherein the second positioner, when provided with the data representing the locations of the balls on the first table, is configured to cause ball locations on the second table to mimic ball positions locations on the first table by selectively activating and deactivating the electromagnetic sections of the second positioner in the paths calculated by the computer controller; and
   wherein the first positioner, when provided with the data representing the locations of the balls on the second table, is configured to cause ball locations on the first table to mimic ball locations on the second table by selectively activating and deactivating the electromagnetic sections of the first positioner in the paths calculated by the computer controller.

2. The system of claim 1, wherein the cue sport is selected from the group consisting of pool, billiards, and snooker.

3. The system of claim 1, wherein the first and second sensor assemblies comprise digital cameras.

4. The system of claim 3, wherein the first and second sensor assemblies also comprise arrays of RFID tags in balls and RFID reader arrays associated with the tables.

5. The system of claim 1, wherein at least one such table has a capability that can store information about a selected positional array of balls on the table, as well as a reset capability that when activated allows the positioner associated with that table to cause the balls to return to that positional array.

6. The system of claim 1, further comprising a scoring system that automatically keeps track of and displays results of play at the first and second tables.

7. The system of claim 1, wherein the system has the capability of automatically setting up ball positions on the first and second tables at the start of a match between players at the first and second tables.

8. The system of claim 7, comprising an automatic racking capability at the first and second tables.

9. The system of claim 1, wherein the system is capable of automatically determining if a scratch has occurred, and if so automatically releasing a cue ball in such a case for further play.

10. The system of claim 1, further comprising a capability of conditioning use of the system on an authorization communication.

11. The system of claim 1, wherein the system has the capability of automatically returning improperly pocketed balls to the first and second tables during a match.

12. The system of claim 1, wherein each independently activatable electromagnetic section within the grid array is an electromagnetic coil responsive to a unique pulse width modulation stored by the computer controller.

* * * * *